(12) United States Patent
Paulsen et al.

(10) Patent No.: US 10,594,001 B2
(45) Date of Patent: Mar. 17, 2020

(54) SMART BATTERY

(71) Applicant: Packet Digital, LLC, Fargo, ND (US)

(72) Inventors: Andrew Paulsen, Fargo, ND (US); Joshua Anderson, Moorhead, MN (US)

(73) Assignee: Packet Digital, LLC, Fargo, ND (US)

( * ) Notice: Subject to any disclaimer, the term of this patent is extended or adjusted under 35 U.S.C. 154(b) by 78 days.

(21) Appl. No.: 15/851,821

(22) Filed: Dec. 22, 2017

(65) Prior Publication Data

US 2018/0323478 A1    Nov. 8, 2018

Related U.S. Application Data

(60) Provisional application No. 62/503,217, filed on May 8, 2017.

(51) Int. Cl.
| | |
|---|---|
| *H01M 10/42* | (2006.01) |
| *H01M 10/48* | (2006.01) |
| *H01M 10/0525* | (2010.01) |

(52) U.S. Cl.
CPC ... *H01M 10/4257* (2013.01); *H01M 10/0525* (2013.01); *H01M 10/48* (2013.01); *H01M 2010/4278* (2013.01)

(58) Field of Classification Search
CPC ......... H01M 10/0525; H01M 10/4257; H01M 10/48; H01M 2010/4278
See application file for complete search history.

(56) References Cited

U.S. PATENT DOCUMENTS

| | | | | |
|---|---|---|---|---|
| 4,553,081 A | * | 11/1985 | Koenck | G01R 31/36 320/131 |
| 6,103,408 A | * | 8/2000 | Richter | H01M 10/48 429/7 |
| 2013/0067256 A1 | * | 3/2013 | Shiraishi | G06F 1/3212 713/320 |
| 2016/0294019 A1 | * | 10/2016 | Yamauchi | H02J 7/02 |
| 2018/0026255 A1 | * | 1/2018 | Hellenthal | B60L 50/64 429/50 |

* cited by examiner

*Primary Examiner* — Carlos Barcena
(74) *Attorney, Agent, or Firm* — Smith, Gambrell & Russell, LLP

(57) ABSTRACT

Embodiments of the present systems and methods may provide the capability to provide more detailed and granular battery function information and control of battery management and monitoring functions. For example, in an embodiment, a battery apparatus may comprise a plurality of power cells, memory attached to each power cell adapted to store information relating to operational parameters of each power cell, and measurement circuitry adapted to measure operational parameters of each power cell and to store information relating to operational parameters of each power cell in each respective attached memory and to measure operational parameters of the battery apparatus and to store information relating to operational parameters of the battery apparatus in a memory, wherein the circuitry adapted to measure operational parameters of each power cell may be further adapted to alter the measurement operation based on usage of the battery apparatus.

14 Claims, 5 Drawing Sheets

SMART BATTERY

BACKGROUND

The present invention relates to a smart battery having built-in battery management and monitoring functions.

Batteries are the power sources for a vast number of mobile electrical and electronic devices. As battery technology has evolved to Lithium-based chemistries, the challenges in charging such batteries, and in obtaining optimum power output and lifetime from such batteries have increased. In order to meet these challenges, many modern batteries provide some level of communication between the battery, the equipment and the user. The level of communication varies among applications and industries, but the most basic smart battery may contain nothing more than a chip that sets the charger to the correct charge algorithm. More advanced smart batteries may provide state-of-charge indications. However, more demanding applications require more detailed and granular battery function information and control.

A need arises for techniques for providing more detailed and granular battery function information and control of battery management and monitoring functions.

SUMMARY

Embodiments of the present systems and methods may provide the capability to provide more detailed and granular battery function information and control of battery management and monitoring functions.

For example, in an embodiment, a battery apparatus may comprise a plurality of power cells, memory attached to each power cell adapted to store information relating to operational parameters of each power cell, and measurement circuitry adapted to measure operational parameters of each power cell and to store information relating to operational parameters of each power cell in each respective attached memory and to measure operational parameters of the battery apparatus and to store information relating to operational parameters of the battery apparatus in a memory, wherein the circuitry adapted to measure operational parameters of each power cell may be further adapted to alter the measurement operation based on usage of the battery apparatus.

In embodiments, the power cells may be lithium ion battery modules. The measured operational parameters of the power cells may include a voltage of each power cell, a temperature of each power cell, and a current flow of each power cell. The measurement circuitry may be further adapted to store information relating to operational parameters of each power cell and information relating to operational parameters of the battery apparatus in sets based on measured activity of the battery apparatus. The measurement circuitry may be further adapted to measure and store information relating to faults in the condition or operation of each power cell and of the battery apparatus. The stored information may be encrypted. The measurement operation may be altered by reducing a frequency of measurement when the battery apparatus is inactive for a period of time. The frequency of measurement may be reduced more the longer the battery apparatus is inactive. The apparatus may further comprise communication circuitry adapted to transmit at least a portion of the stored information to an external device.

In an embodiment, a method may comprise measuring operational parameters operational parameters of a battery apparatus comprising a plurality of power cells, memory attached to each power cell adapted to store information relating to operational parameters of each power cell, measurement circuitry adapted to measure operational parameters of each power cell and to store information relating to operational parameters of each power cell in each respective attached memory and to measure operational parameters of the battery apparatus and to store information relating to operational parameters of the battery apparatus in a memory and altering measuring the operational parameters based on usage of the battery apparatus.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide the capability to provide more detailed and granular battery function information and control of battery management and monitoring functions.

Embodiments of the present systems and methods may provide an intelligent battery system including, for example, lithium ion battery modules, a battery management system (BMS) for monitoring and recording the key operational parameters of the battery modules, a database for keeping track of the key metrics for one or more batteries, and onboard storage for waveform data from recent usage. For example, the BMS may provide the capability for cell voltage monitoring, cell balancing, temperature monitoring, maximum current monitoring and control, and streaming or queryable real-time status information during use.

In embodiments, the present systems and methods may provide functionality such as measuring and storing usage data, marking stored waveform data in sets based on observed activity, for example, based on no observed current drain for a period of time, and measuring and storing faults, operating conditions, etc. Such data may be stored in encrypted form to ensure integrity of the data. The data may be stored physically in conjunction with each battery pack or sub-pack, so that the data remains with the battery cells. Such data may be read and written by multiple "docks", chargers, or other "reader" devices. Battery state may be automatically shifted into deeper sleep modes based on observed activity. The longer the period of inactivity, the more peripherals may be disabled and the time period for polling sensors may be extended until it ultimately shifts to storage mode which requires a button press to wake up from.

Figure 1:
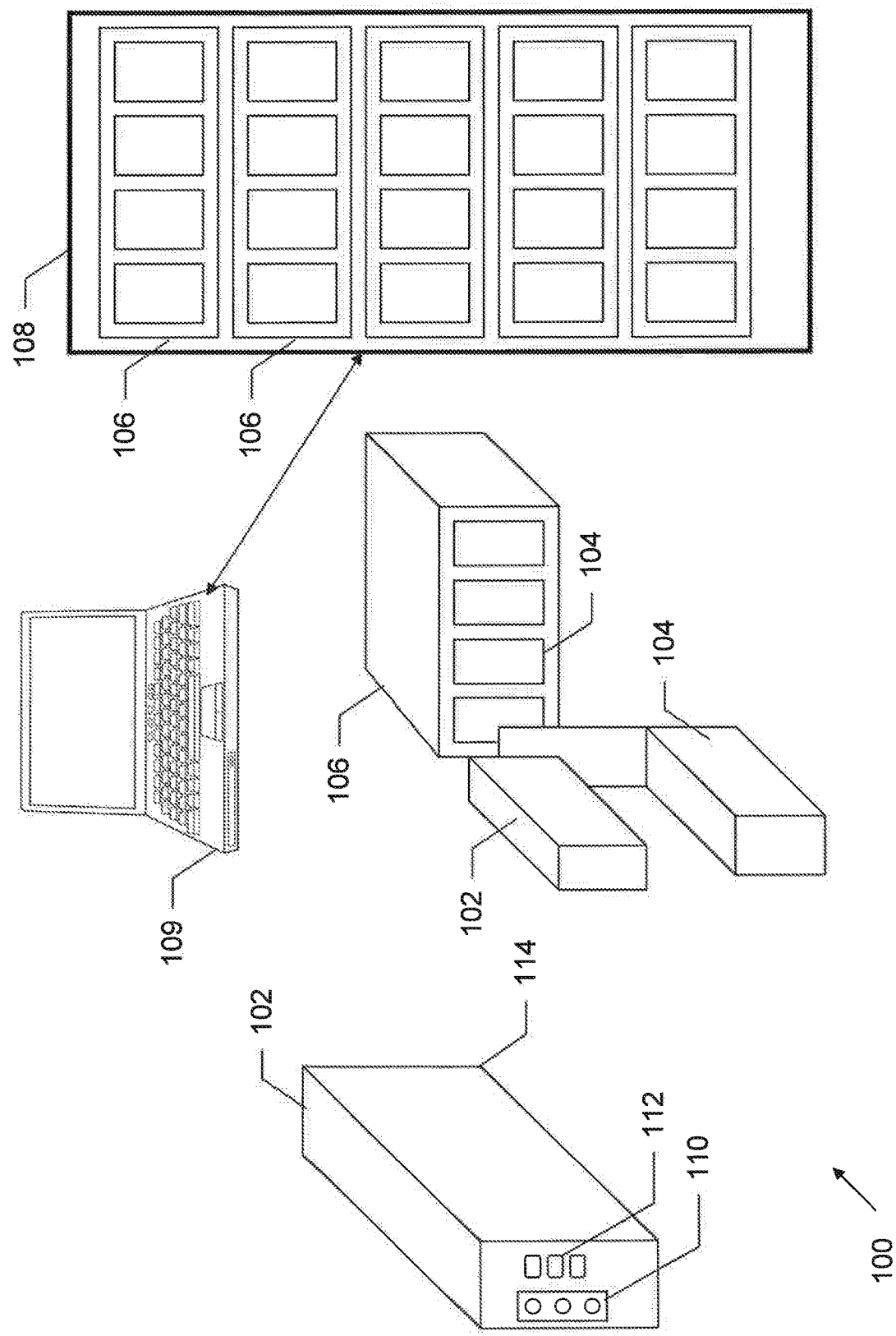
FIG. 1 illustrates an exemplary block diagram of major components of smart battery system in accordance with embodiments of the present invention.

An example of major components of a smart battery system 100 is shown in FIG. 1. System 100 may include one or more battery assemblies 102, including a battery management system (BMS), one or more battery charging containers 104, one or more battery charging modules 106, one or more battery charging racks 108, and a computer system 109. For example, computer system 109 may be communicatively connected to one or more battery assemblies 102, one or more battery charging containers 104, one or more battery charging modules 106, and/or one or more battery charging racks 108, to communicate with each such device for control and monitoring, as well as database and statistical functions. Likewise, each battery charging rack 108 may include standard rack cabinets and mounting hardware adapted to hold a plurality of battery charging modules 106, as well as AC power connection, protection, and distribution circuitry. Each battery charging module 106 may, for example, be adapted to hold a plurality of battery charging containers 104, each container holding a battery assembly 102. Each battery charging module 106 may include battery charging circuitry, as well as circuitry to monitor battery charging conditions and circuitry to communicate with each contained battery assembly 102. Each battery charging container 104 may provide a controlled battery charging environment for charging each battery assembly 102, as well at the necessary circuitry for charging, monitoring, and communicating with each battery assembly 102. Each battery assembly 102 may include a plurality of power cells, as well as circuitry implementing a BMS, such as status indicators 110, standard communication ports 112, and power supply/charging ports 114.

Figure 2:
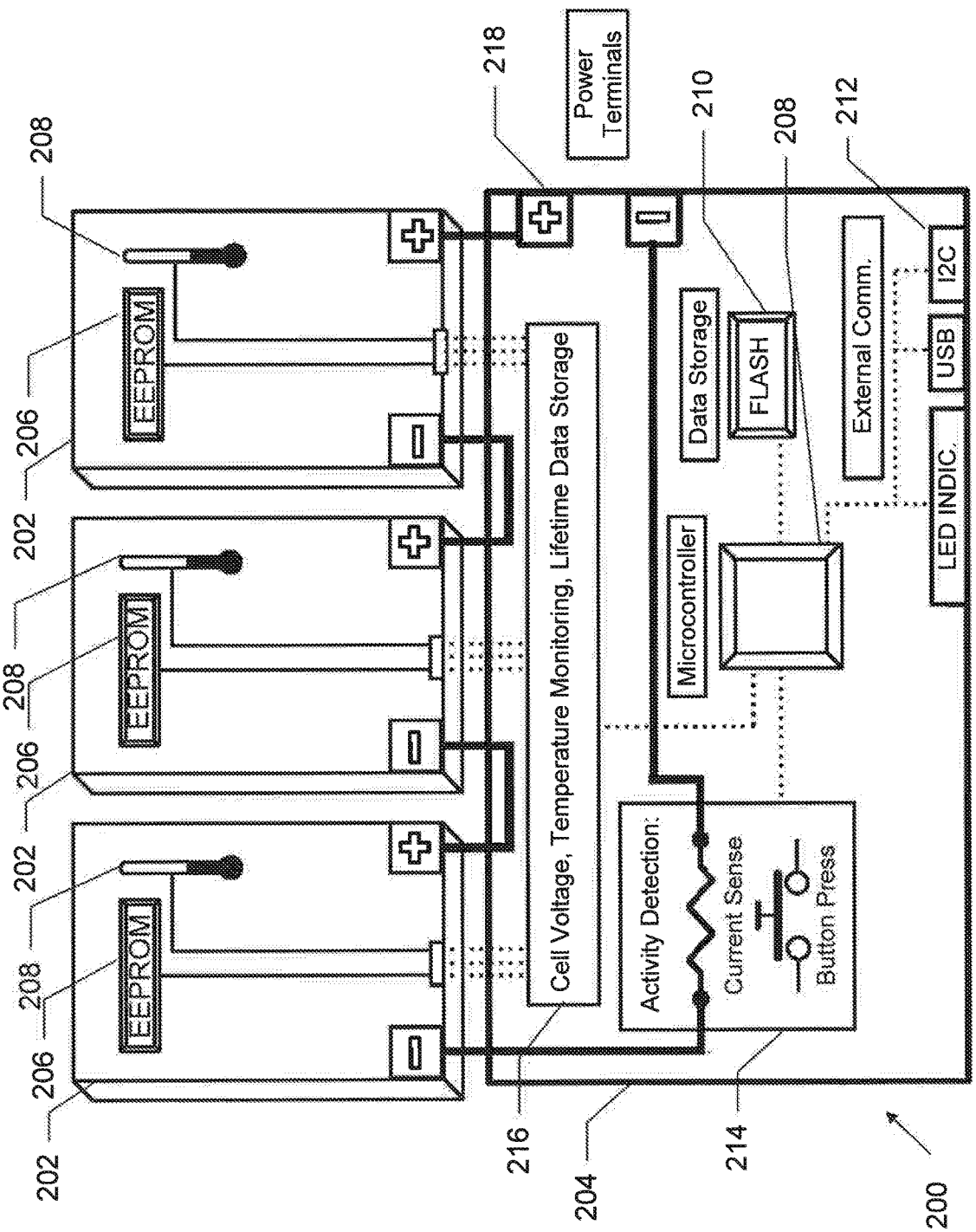
FIG. 2 illustrates an exemplary block diagram of a battery management system, which may be included in a battery assembly shown in FIG. 1.

An exemplary block diagram of a BMS 200, which may be included in a battery assembly 102, is shown in FIG. 2. BMS 200 may provide the capability for monitoring and recording the key operational parameters of the battery modules. Such parameters may include power cell voltage monitoring, power cell balancing, temperature monitoring, current monitoring, and streaming or queryable real-time status information for use during operation.

BMS 200 may include a plurality of power cells 202, as well as charging and monitoring circuitry 204. Power cells 202 may include, for example, rechargeable cells of suitable chemistry, such as Lithium ion cells (Li-ion). In embodiments, other cell chemistries may be used, such as nickel-cadmium (NiCd), nickel-zinc (NiZn), nickel metal hydride (NiMH), lithium-ion polymer (Li-ion polymer), etc. Included in, attached to, or associated with each power cell 202 may be usage storage 206 and temperature sensor 208. Usage storage 206 may be any type of non-volatile memory, such as EEPROM or Flash memory, and may be attached to each power cell. Usage information relating to a power cell 202 may be stored by charging and monitoring circuitry 204. As usage storage 206 is attached to each power cell 202, if power cells 202 are moved between battery assemblies, the usage information for each cell moves with each cell and thus, is still available. Temperature sensor 208 may provide sensing of temperature of each power cell 202, for use by charging and monitoring circuitry 204.

Charging and monitoring circuitry 204 may include circuitry for controlling charging and monitoring charging and operation of power cells 202, as well as for storing data relating to the monitoring. For example, charging and monitoring circuitry 204 may include microcontroller 208, data storage 210, external communication ports 212, activity detection circuitry 214, monitoring and data storage circuitry 216, and power terminals 218. Microcontroller 208 may be, for example, a single-chip or embedded microprocessor or controller, including, for example, memory storing program instructions and data, input/output circuitry, and control circuitry. Data storage 210 may include non-volatile memory, such as EEPROM or Flash memory, and may be internal or external to microcontroller 208.

External communication ports 212 may include interface circuitry and connectors to provide communications connectivity by implementing standard or proprietary communications systems and protocols. Such interface circuitry may be internal or external to microcontroller 208. In addition, external communication ports 212 may include visible indicators of system status, such as light-emitting diode (LED) indicators or displays. Activity detection circuitry 214 may include circuitry for measuring operational activity of power cells 202. For example, activity detection circuitry 214 may include circuitry to measure the instantaneous or maximum current draw from power cells 202, or from each power cell. Instantaneous current draw may be measured during normal operation, while maximum current draw may be measured during normal operation or during a test mode initiated, for example, by a button attached to or included in BMS 200.

Data storage circuitry 216 may provide permanent or lifetime storage for data relating to, for example, power cell voltage, monitored temperature, etc. In embodiments, microcontroller 208 may implement processes for measuring and storing usage data. For example, waveform data stored in usage storage 206 may be organized and marked as sets of data based on observed activity. For example, such sets may be separated by periods of no current draw from power cells 202 for a fixed or adjustable a period of time. Likewise, operating conditions, which may include normal operation, as well as fault conditions, may be measured and stored. Such information may, for example, be useful to determine warranty compliance.

Data may be stored in encrypted form to ensure integrity of data and ensure data is uploaded to manufacturer's server.

Correlating Usage and Fault Data

Storing data on sub-pack so data remains with battery cells, can be read and written by multiple "docks", chargers, or other "reader" devices.

Automatic shift into deeper sleep modes based on observed activity. The longer the period of inactivity, the more peripherals are disabled and the time period for polling sensors is extended until it ultimately shifts to storage mode which requires a button press to wake up from. This is shown in more detail in FIG. 4 and described below.

Figure 3:
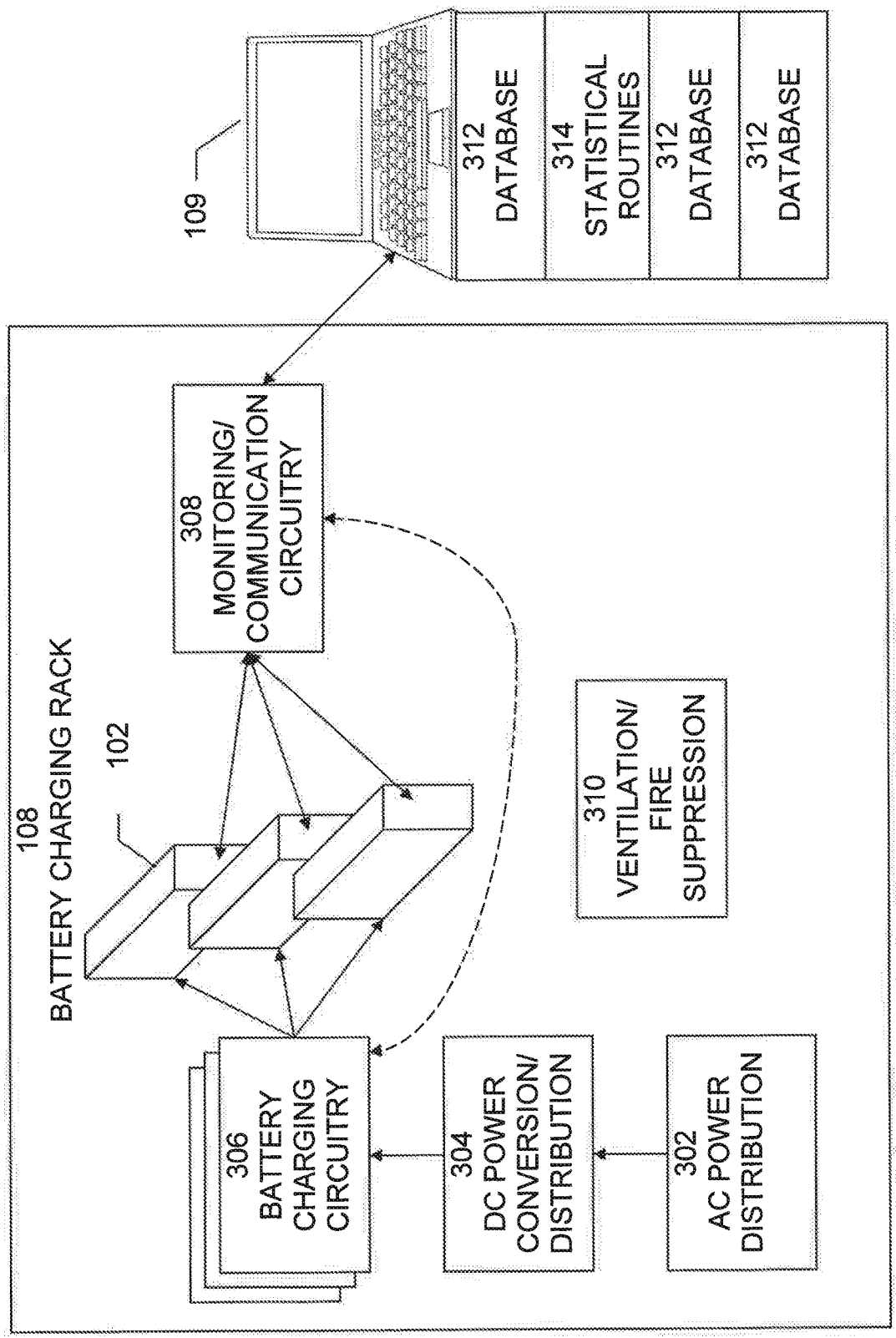
FIG. 3 is an exemplary block diagram of circuitry included in a battery charging rack, as well as an associated computer system, in accordance with embodiments of the present invention.

An exemplary block diagram of circuitry included in battery charging rack 108, as well as associated computer system 109 is shown in FIG. 3. Battery charging rack 108 may include AC power distribution circuitry 302, DC power conversion/distribution circuitry 304, battery charging circuitry 306, monitoring/communication circuitry 308, and ventilation 310. AC power distribution circuitry 302 may include connections to AC power mains, as well as AC power connections to one or more units of DC power conversion/distribution circuitry 304. DC power conversion/distribution circuitry 304 may include circuitry to convert AC power to DC power of the proper voltages to operate battery charging circuitry 306. In embodiments, such power conversion circuitry may have a fixed DC voltage output, an adjustable output, or a plurality of outputs of different voltages. In embodiments, voltage adjustments may be made manually or automatically, or a combination of both. DC power conversion/distribution circuitry 304 may include circuitry to distribute appropriate DC power to one or more units of battery charging circuitry 306. Battery charging circuitry 306 may include circuitry to apply voltages to battery assemblies 102 so as to recharge the power cells contained therein. In embodiments, battery charging circuitry 306 may have a fixed DC voltage or current output, an adjustable voltage or current output, or a plurality of outputs of different voltages voltage or currents. In embodiments, voltage or current output, or both, may be controlled so as to apply the appropriate charging profile to each battery assembly 102, based on parameters such as the battery chemistry, the prior use profile of each cell (as stored in usage storage 206, shown in FIG. 2), the prior use profile of each battery assembly 102 (as stored in data storage 210, shown in FIG. 2), the temperature of each of each cell (as sensed by temperature sensor 208, shown in FIG. 2), etc.

Battery charging rack 108 and/or battery charging modules 106 may include ventilation and fire suppression hardware. For example, ventilation, such as fans, may provide the capability to control the temperature of the charging environment to prevent battery assemblies 102 and/or power cells 202 from overheating. In embodiments, such ventilation may provide constant airflow, or it may provide variable airflow controlled, for example, based on the monitored temperatures of each battery assembly 102 and/or power cell 202. In embodiments, fire suppression equipment may provide the capability to prevent or extinguish fires that may start due to overheating of battery assemblies 102 and/or power cells 202. For example, such fire suppression equipment may include application of fire suppression liquids or foams based on detection of smoke or high temperatures.

In embodiments, monitoring/communication circuitry 308 may include circuitry to communicate with the BMS 200 of each battery assembly 102, so as to read current conditions of each battery assembly 102 and/or stored data from each BMS 200. Monitoring/communication circuitry 308 may include circuitry to communicate with battery charging circuitry 306, so as to communicate to battery charging circuitry 306 the current conditions of each battery assembly 102 and/or stored data from each BMS 200.

Monitoring/communication circuitry 308 may further include circuitry to communicate with computer system 109, which may provide aggregation and statistical functionality. For example, computer system 109 may include a database 312 for keeping track of the key metrics for one or more battery assemblies or power cells, statistical software 314 for generating aggregate and statistical information based on the operational data.

Not shown in FIG. 3, but shown in FIG. 1, are battery charging modules 106 and battery charging containers 104. The circuitry and functionality shown in FIG. 3 may be included in or distributed among any of battery charging rack 108, battery charging modules 106, and battery charging containers 104, in any arrangement.

Figure 4:
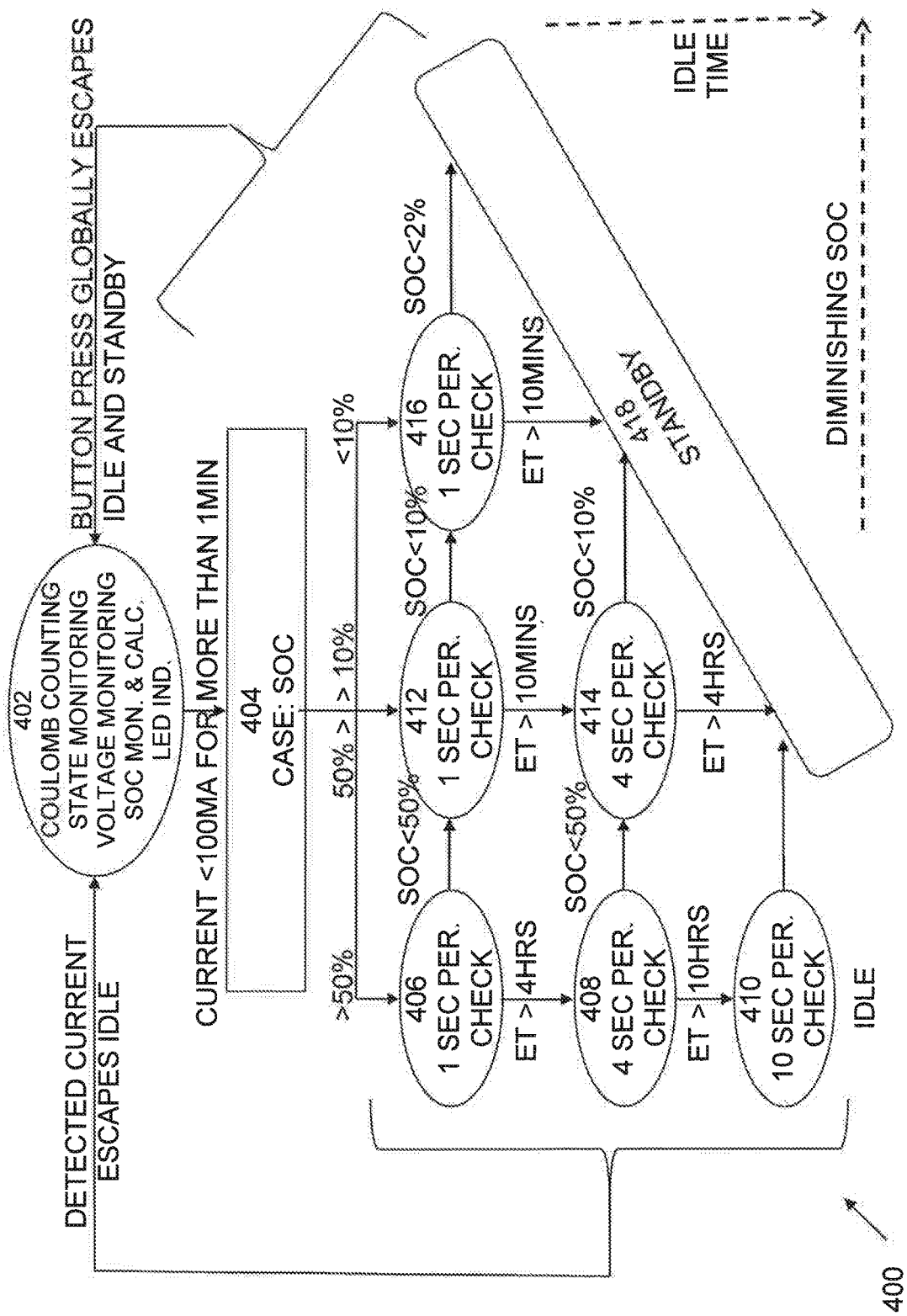
FIG. 4 is an exemplary flow diagram of a process of operation of a battery management system in accordance with embodiments of the present invention.

An exemplary flow diagram of a process 400 of operation of BMS 200, shown in FIG. 2, is shown in FIG. 4. Process 400 begins with 402, in which State-of-Charge (SOC) monitoring operation of BMS 200 may occur. At 402, the SOC operation may include coulomb counting, in which the in-and-out-flowing current from power cells 202, shown in FIG. 2, may be measured; state monitoring, in which the operational state of power cells 202 may be measured; voltage monitoring, in which voltage of power cells 202 may be measured; and SOC monitoring and calculation, in which the measured coulomb counting values, the operational state values, and the measured voltage values may be used to calculate an overall SOC for power cells 202. Further, SOC indications may be displayed, for example, on LED indicators 212, shown in FIG. 2.

In the example of FIG. 4, when the current outflow from power cells 202 drops below a defined threshold, such as 100 mA, for a defined time period, such as more than one minute, process 400 may proceed to an idle condition 404, in which monitoring decisions may be made based on the currently calculated SOC. For example, in the case where the SOC is greater than 50%, process 400 may proceed with 406, in which a check (round of monitoring measurements) may be made each second. After an elapsed time (ET) in this state, such as more than four hours, process 400 may proceed with 408, in which a check may be made every four seconds. After an elapsed time (ET) in this state, such as more than ten hours, process 400 may proceed with 410, in which a check may be made every ten seconds. When, at 410, the SOC drops to, for example, between 50% and 10%, the process may proceed to standby state 418.

If, at 404, the SOC is between 50% and 10%, the process may proceed with 412, in which a check may be made each second. After an elapsed time (ET) in this state, such as more than ten minutes, process 400 may proceed with 414, in which a check may be made every four seconds. After an elapsed time (ET) in this state, such as more than four hours, or when the SOC drops to, for example, less than 10%, process 400 may proceed to standby state 418.

If, at 404, the SOC is less than 10%, the process may proceed with 416, in which a check may be made each second. After an elapsed time (ET) in this state, such as more than ten minutes, or When the SOC drops to, for example, less than 2%, process 400 may proceed to standby state 418.

At any time during the idle state 404-416, detection of current greater than a defined threshold, which may be the same as the threshold used to enter the idle state 404-416, or which may be different than the threshold used to enter the idle state 404-416, may cause the process to exit the idle state and proceed with 402, in which State-of-Charge (SOC) monitoring operation of BMS 200 may occur. Likewise, at any time during the idle state 404-416 or during the standby state 418, detection of a user indication, such as a button press, may cause the process to exit the idle state 404-416 or the standby state 418 and proceed with 402, in which State-of-Charge (SOC) monitoring operation of BMS 200 may occur.

Figure 5:
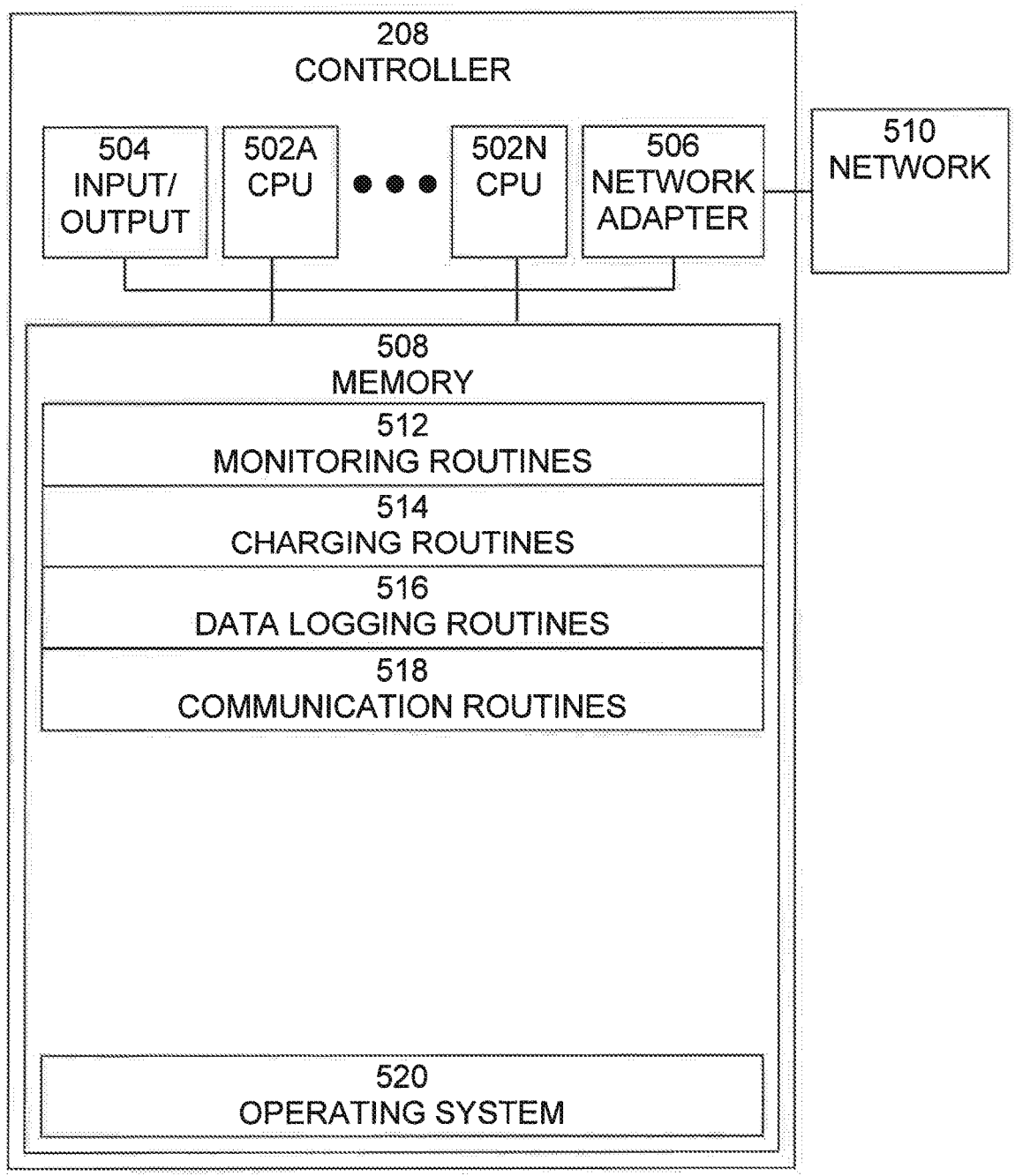
FIG. 5 is an exemplary block diagram of a controller in accordance with embodiments of the present invention.

An exemplary block diagram of a controller 208, in which processes involved in the embodiments described herein may be implemented, is shown in FIG. 5. Typically controller 208 may be implemented using one or more programmed devices, such as a microcontroller, an embedded processor, or a system on a chip. Controller 208 may include one or more processors (CPUs) 502A-502N, input/output circuitry 504, network adapter 506, and memory 508. CPUs 502A-502N execute program instructions in order to carry out the functions of the present communications systems and methods. Typically, CPUs 502A-502N are one or more processor cores. FIG. 5 illustrates an embodiment in which controller 208 is implemented as a single multi-core computer computing device, in which multiple processors 502A-502N share system resources, such as memory 508, input/output circuitry 504, and network adapter 506. However, the present communications systems and methods may also include other embodiments.

Input/output circuitry 504 provides the capability to input data to, or output data from, controller 208. For example, input/output circuitry may include input devices, such as microphones, keyboards, mice, touchpads, trackballs, scanners, analog to digital converters, etc., output devices, such as speakers, lighting devices, video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of controller 208. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof; such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that controller 208 is programmed to perform. In the example shown in FIG. 5, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 5, memory 508 may include monitoring routines 512, charging routines 514, data logging routines 516, communication routines 518, and operating system 520. Monitoring routines 512 may include software routines that may provide the capability to monitor parameters, such as SOC-related parameters, including coulomb counting, state monitoring, voltage monitoring, and SOC monitoring and calculation, as well as other operational parameters, such as temperature monitoring. Charging routines 514 may include software routines that may provide the capability to control or monitor charging of the power cells in a battery assembly. Data logging routines 516 may include software routines that may provide the capability to log and store data produced by monitoring SOC and other operational parameters of a battery assembly. Communication routines 518 may include software routines that may provide the capability to communicate with external devices. Operating system 520 may provide overall system functionality.

As shown in FIG. 5, the present communications systems and methods may include implementation on a system or systems that provide multi-processor, multi-tasking, multi-process, and or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. Battery apparatus comprising:
   a plurality of power cells;
   memory attached to each power cell configured to store information relating to operational parameters of each power cell; and
   measurement circuitry configured to measure operational parameters of each power cell and to store information relating to operational parameters of each power cell in each respective attached memory and to measure operational parameters of the battery apparatus and to store information relating to operational parameters of the battery apparatus in a memory;
   wherein the circuitry configured to measure operational parameters of each power cell is further configured to alter the measurement operation based on usage of the battery apparatus, wherein the measurement operation is altered by reducing a frequency of measurement when the battery apparatus is inactive for a period of time, and wherein the frequency of measurement is reduced more the longer the battery apparatus is inactive.

2. The apparatus of claim 1, wherein the power cells are lithium ion battery modules.

3. The apparatus of claim 1, wherein the measured operational parameters of the power cells include a voltage of each power cell, a temperature of each power cell, and a current flow of each power cell.

4. The apparatus of claim 3, wherein the measurement circuitry is further configured to store information relating to operational parameters of each power cell and information relating to operational parameters of the battery apparatus in sets based on measured activity of the battery apparatus.

5. The apparatus of claim 4, wherein the measurement circuitry is further configured to measure and store information relating to faults in the condition or operation of each power cell and of the battery apparatus.

6. The apparatus of claim 1, wherein the stored information is encrypted.

7. The apparatus of claim 1, further comprising communication circuitry configured to transmit at least a portion of the stored information to an external device.

8. A method comprising:
   measuring operational parameters operational parameters of a battery apparatus comprising a plurality of power cells, memory attached to each power cell configured to store information relating to operational parameters of each power cell, measurement circuitry configured to measure operational parameters of each power cell and to store information relating to operational parameters of each power cell in each respective attached memory and to measure operational parameters of the battery apparatus and to store information relating to operational parameters of the battery apparatus in a memory; and altering measuring the operational parameters based on usage of the battery apparatus, wherein the measuring the operational parameters is altered by reducing a frequency of measurement when the battery apparatus is inactive for a period of time, and wherein the frequency of measurement is reduced more the longer the battery apparatus is inactive.

9. The method of claim 8, wherein the power cells are lithium ion battery modules.

10. The method of claim 8, wherein the measured operational parameters of the power cells include a voltage of each power cell, a temperature of each power cell, and a current flow of each power cell.

11. The method of claim 10, further comprising storing information relating to operational parameters of each power cell and information relating to operational parameters of the battery apparatus in sets based on measured activity of the battery apparatus.

12. The method of claim 11, further comprising measuring and storing information relating to faults in the condition or operation of each power cell and of the battery apparatus.

13. The method of claim 8, further comprising encrypting the stored information.

14. The method of claim 8, transmitting at least a portion of the stored information to an external device.

* * * * *